(12) United States Patent
Narendra et al.

(10) Patent No.: US 11,768,729 B2
(45) Date of Patent: Sep. 26, 2023

(54) METHOD AND APPARATUS FOR SECURE AND VERIFIABLE COMPOSITE SERVICE EXECUTION AND FAULT MANAGEMENT ON BLOCKCHAIN

(71) Applicant: Telefonaktiebolaget LM Ericsson (publ), Stockholm (SE)

(72) Inventors: Nanjangud Chandrasekhara Swamy Narendra, Bangalore (IN); James Kempf, Mountain View, CA (US); Sambit Nayak, Orissa (IN); Anshu Shukla, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 353 days.

(21) Appl. No.: 17/281,346

(22) PCT Filed: Oct. 3, 2018

(86) PCT No.: PCT/EP2018/076885
§ 371 (c)(1),
(2) Date: Mar. 30, 2021

(87) PCT Pub. No.: WO2020/069735
PCT Pub. Date: Apr. 9, 2020

(65) Prior Publication Data
US 2021/0382773 A1 Dec. 9, 2021

(51) Int. Cl.
*G06F 11/07* (2006.01)
*G06F 11/32* (2006.01)
(Continued)

(52) U.S. Cl.
CPC ........ *G06F 11/079* (2013.01); *G06F 11/0709* (2013.01); *G06F 11/323* (2013.01);
(Continued)

(58) Field of Classification Search
CPC .. G06F 11/079; G06F 11/0709; G06F 11/323; G06F 9/52; G06F 2209/521; H04L 9/0825; H04L 9/083
See application file for complete search history.

(56) References Cited

U.S. PATENT DOCUMENTS

| 5,940,839 A | 8/1999 | Chen et al. |
| 2015/0227405 A1* | 8/2015 | Jan ............... G06F 11/0778 714/37 |

(Continued)

OTHER PUBLICATIONS

Unknown, Author, "Public / Private Keys and Signing", To. NET, Feb. 2, 2018, 1-15.

*Primary Examiner* — Jigar P Patel
(74) *Attorney, Agent, or Firm* — Murphy, Bilak & Homiller, PLLC (57) ABSTRACT

A method is implemented by one or more network devices to identify an originating point of failure in a composite service executed in a cloud computing environment. The execution of the composite service includes execution of a plurality of atomic services in an ordered sequence, where for each atomic service that is executed, an execution trace for that atomic service is stored in a blockchain to form an ordered sequence of execution traces, where the execution trace for a given atomic service is signed using the private key associated with that atomic service and analyzing one or more of the ordered sequence of execution traces to determine which of the plurality of atomic services originated the failure, where each execution trace that is analyzed is authenticated using the public key that corresponds to the private key associated with the atomic service that generated that execution trace.

20 Claims, 5 Drawing Sheets

(51) Int. Cl.
*H04L 9/08* (2006.01)
*G06F 9/52* (2006.01)
*H04L 9/00* (2022.01)

(52) U.S. Cl.
CPC ............ *H04L 9/083* (2013.01); *H04L 9/0825* (2013.01); *G06F 9/52* (2013.01); *G06F 2209/521* (2013.01); *H04L 9/50* (2022.05)

(56) References Cited

U.S. PATENT DOCUMENTS

2017/0155724 A1\* 6/2017 Haddad ................. H04L 61/503
2017/0213209 A1 7/2017 Dillenberger \* cited by examiner

METHOD AND APPARATUS FOR SECURE AND VERIFIABLE COMPOSITE SERVICE EXECUTION AND FAULT MANAGEMENT ON BLOCKCHAIN

TECHNICAL FIELD

Embodiments of the invention relate to the field of cloud computing; and more specifically, to identifying an originating point of failure in a composite service executed in a cloud computing environment.

BACKGROUND ART

Cloud computing refers to a paradigm of using a network of remote servers (typically accessible over the Internet) to store, manage, and process data rather than using a local server or a personal computer. Cloud computing is becoming increasingly popular as it allows organizations to focus on their core business instead of expending resources on computer infrastructure and maintenance. Cloud computing environments typically host a variety of services provided by different service providers. In many business scenarios, composite services are created to fulfill user requirements. A composite service is a service that is comprised of multiple individual services that are to be executed in a predefined ordered sequence. In the context of composite services, the individual services that comprise the composite service may be referred to as atomic services. As an example, a travel itinerary booking service can be modeled as a composite service that comprises a flight booking atomic service, a taxi booking atomic service, a hotel booking atomic service, and a museum booking atomic service.

In some cases, a failure in one of the atomic services of a composite service may go undetected and be propagated to subsequent atomic services in the sequence. This failure may manifest itself in the subsequent atomic service, where it is finally detected. Thus, the failure is manifested in the subsequent atomic service even though the failure originated from a previous atomic service. In these cases, it can be difficult to identify the originating point of failure, and to do this in a tamper-proof and non-repudiable manner.

SUMMARY

A method is implemented by one or more network devices to identify an originating point of failure in a composite service executed in a cloud computing environment. The method includes causing the composite service to be executed in the cloud computing environment, where the execution of the composite service includes execution of a plurality of atomic services in a predefined ordered sequence, where each of the atomic services is associated with a private key and a corresponding public key, where for each atomic service that is executed as part of the execution of the composite service, an execution trace for that atomic service is stored in a blockchain to form an ordered sequence of execution traces, where the execution trace for a given atomic service indicates an execution input of that atomic service and an execution output of that atomic service and is signed using the private key associated with that atomic service, determining that a failure occurred during execution of the composite service, and analyzing one or more of the ordered sequence of execution traces in reverse order to determine which of the plurality of atomic services originated the failure, where each execution trace that is analyzed is authenticated using the public key that corresponds to the private key associated with the atomic service that generated that execution trace.

A network device is configured to identify an originating point of failure in a composite service executed in a cloud computing environment. The network device includes a set of one or more processors and a non-transitory machine-readable storage medium having stored therein a service composition engine component. The service composition engine component, when executed by the set of one or more processors, causes the network device to cause the composite service to be executed in the cloud computing environment, where the execution of the composite service includes execution of a plurality of atomic services in a predefined ordered sequence, where each of the atomic services is associated with a private key and a corresponding public key, where for each atomic service that is executed as part of the execution of the composite service, an execution trace for that atomic service is stored in a blockchain to form an ordered sequence of execution traces, where the execution trace for a given atomic service indicates an execution input of that atomic service and an execution output of that atomic service and is signed using the private key associated with that atomic service, determine that a failure occurred during execution of the composite service, and analyze one or more of the ordered sequence of execution traces in reverse order to determine which of the plurality of atomic services originated the failure, where each execution trace that is analyzed is authenticated using the public key that corresponds to the private key associated with the atomic service that generated that execution trace.

A non-transitory machine-readable medium has computer code stored therein, which when executed by a set of one or more processors of one or more network devices, causes the one or more network devices to perform operations for identifying an originating point of failure in a composite service executed in a cloud computing environment. The operations include causing the composite service to be executed in the cloud computing environment, where the execution of the composite service includes execution of a plurality of atomic services in a predefined ordered sequence, where each of the atomic services is associated with a private key and a corresponding public key, where for each atomic service that is executed as part of the execution of the composite service, an execution trace for that atomic service is stored in a blockchain to form an ordered sequence of execution traces, where the execution trace for a given atomic service indicates an execution input of that atomic service and an execution output of that atomic service and is signed using the private key associated with that atomic service, determining that a failure occurred during execution of the composite service, and analyzing one or more of the ordered sequence of execution traces in reverse order to determine which of the plurality of atomic services originated the failure, where each execution trace that is analyzed is authenticated using the public key that corresponds to the private key associated with the atomic service that generated that execution trace.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for identifying an originating point of failure in a composite service executed in a cloud computing environment. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a desktop computer, a laptop, a network node, a smart phone, a tablet, a smart watch, etc.) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radio frequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices).

Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A composite service is a service that is comprised of multiple atomic services that are to be executed in a predefined ordered sequence. In some cases, a failure in one of the atomic services of a composite service may go undetected, but then manifest itself in a subsequent atomic service in the sequence, where it is finally detected. In these cases, it can be difficult to identify the originating point of failure, and to do this in a tamper-proof and non-repudiable manner.

Embodiments described herein provide a technique for identifying an originating point of failure in a composite service executed in a cloud computing environment in a tamper-proof and non-repudiable manner. According to some embodiments, each atomic service of a composite service is associated with a private key and a corresponding public key (a private/public key pair). Each atomic service that is executed as part of the execution of the composite service generates and stores an execution trace in a blockchain, where the execution trace indicates the execution input and execution output of that atomic service, and where the execution trace is signed using the private key associated with that atomic service. Thus, the execution of the composite service may generate an ordered sequence of execution traces that are stored in the blockchain, where each execution trace is signed using a private key (the private key associated with the atomic service that generated the execution trace). If a failure in the composite service execution is detected, the execution traces can be analyzed in reverse order to determine which of the atomic services originated the failure, where each execution trace that is analyzed is authenticated using the public key associated with the atomic service that generated that execution trace. The execution traces are tamper-proof since they are stored in the blockchain and thus they inherit tamper proof properties of the blockchain. Also, the execution traces are non-repudiable since they are signed using a private key and can be authenticated using the corresponding public key. Various embodiments are further described herein below.

Figure 1:
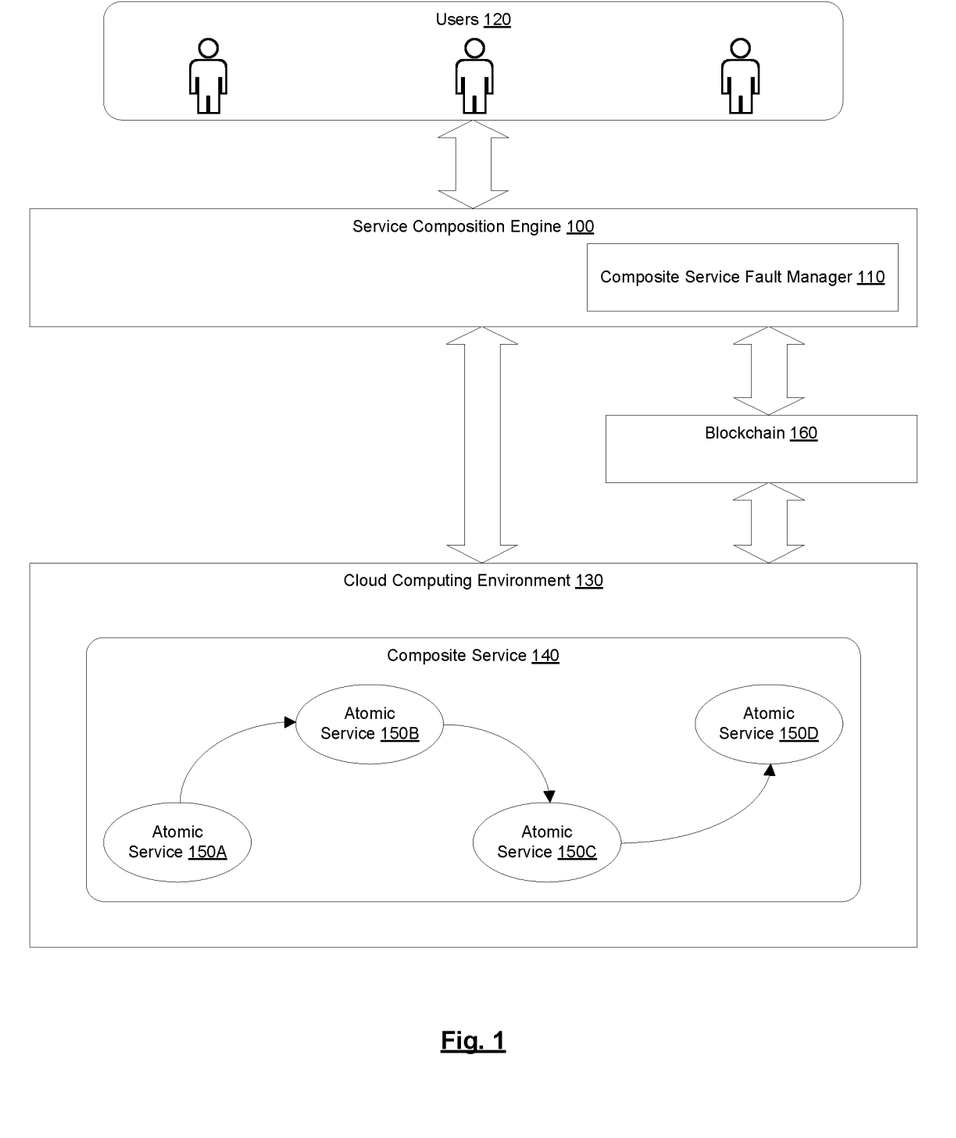
FIG. 1 is a block diagram of a system in which an originating point of failure in a composite service executed in a cloud computing environment can be identified, according to some embodiments.

FIG. 1 is a block diagram of a system in which an originating point of failure in a composite service executed in a cloud computing environment can be identified, according to some embodiments. As shown in the diagram, the system includes users 120, a service composition engine 100, a blockchain 160, and a cloud computing environment 130. The cloud computing environment 130 is capable of providing cloud computing services to the users 120. The users 120 may access the cloud computing services using one or more electronic devices that are communicatively coupled to the cloud computing environment 130. Cloud computing services provide shared resources, software, and information to computers and other devices upon request. In cloud computing environments 130, software can be accessible over the internet rather than installed locally on in-house computer systems. Cloud computing typically involves over-the-Internet provision of dynamically scalable and often virtualized resources. Technological details can be abstracted from the users 120, who no longer have need for expertise in, or control over, the technology infrastructure "in the cloud" that supports them. The cloud computing environment 130 may be implemented using one or more interconnected network devices that are co-located (e.g., in the same datacenter) or distributed (e.g., across multiple geographically separated datacenters). In one embodiment, the cloud computing environment 130 is a multi-cloud environment where multiple cloud providers have signed into a consortium.

As shown in the diagram, the service composition engine 100 is communicatively coupled to the users 120 (more specifically the electronic devices of the users 120) and the cloud computing environment 130 and is configured to compose composite services 140 on behalf of the users 120. A composite service 140 is a service that is comprised of multiple atomic services 150 that are to be executed in a predefined ordered sequence. For example, as shown in the diagram, the service composition engine 100 may compose a composite service 140 to be executed in the cloud computing environment 130 that comprises of atomic service 150A, atomic service 150B, atomic service 150C, and atomic service 150D in that order. Thus, execution of the composite service 140 comprises execution of atomic service 150A, atomic service 150B, atomic service 150C, and atomic service 150D in that order. While in some embodiments all of the atomic services 150 that comprise the composite service 140 are provided by the same entity (e.g., the same service provider), in other embodiments, different ones of the atomic services 150 can be provided by different entities. For sake of clarity and simplicity, the diagram shows a single composite service 140 in the cloud computing environment 130. It should be understood, however, that more than any number of composite services 140 can be deployed/executed in the cloud computing environment 130. The service composition engine 100 may be implemented using one or more network devices.

In some cases, when a composite service 140 is executed, a failure in one of the atomic services 150 of the composite service 140 may go undetected, but then manifest itself in a subsequent atomic service 150 in the sequence, where it is finally detected. For example, a failure in atomic service 150B (e.g., atomic service 150 producing an invalid output) may go undetected and be propagated to atomic service 150C and then further propagated to atomic service 150D, at which the failure is manifested and detected. While the failure is manifested and detected at atomic service 150D, the failure originated from atomic service 150B. In these cases, it can be difficult to identify the originating point of failure, and to do this in a tamper-proof and non-repudiable manner.

As a more concrete example, consider a composite service 140 that provides travel itinerary booking service for a group of one hundred tourists. In contrast to a traditional "package tour" where all tourists have the same itinerary, this travel itinerary booking service allows the tourists to customize portions of their itinerary. Thus, the travel itinerary booking for a particular tourist comprises of a combination of pre-determined itinerary bookings and customized itinerary bookings.

In this example, a subgroup of 80 tourists (referred to as subgroup T1) have an itinerary that includes a visit to a museum, a tourist bus ride, a visit to an art gallery, another tourist bus ride, a visit to a historical site, and a reservation at a restaurant in that order, where the visit to the historical site is the customized portion of the itinerary for subgroup T1. The composite service 140 for booking this itinerary may comprise a museum booking atomic service, a tourist bus ride booking atomic service, an art gallery booking atomic service, another tourist bus ride booking atomic service, a historical site booking atomic service, and a restaurant reservation booking service. In this example, the visit to the art gallery is scheduled to end at 4 pm because this is the time that the art gallery closes. However, the art gallery booking atomic service is faulty and booked the art gallery until 5 pm (which is an invalid booking), which in turn caused the second tourist bus ride booking atomic service to book the second tourist bus ride for 5 pm pickup. This would leave subgroup T1 stranded outside the (closed) art gallery for an hour and may also cause subgroup T1 to miss the visit to the historical site which closes at 5 pm.

Also, in this example, the other subgroup of 20 tourists (referred to as subgroup T2) have an itinerary that includes the visit to the museum, the tourist bus ride, the visit to the art gallery, a taxi ride, a concert, and the restaurant reservation in that order, where the taxi ride and the concert are the customized portions of the itinerary for subgroup T2. The composite service 140 for booking this itinerary may comprise the museum booking atomic service, the tourist bus ride booking atomic service, the art gallery booking atomic service, a taxi ride booking atomic service, a concert booking atomic service, and the restaurant reservation booking service. It is assumed in this example that subgroup T1 and subgroup T2 need to meet at the restaurant for dinner where they have the reservation. Here, in addition to the fault of the art gallery booking atomic service (which would also leave subgroup T2 stranded for an hour outside the art gallery while waiting for the taxi), the concert also finishes about an hour late, due to which subgroup T2 arrives an hour late to the restaurant and lose their table.

While these failures originate from the faulty booking of the art gallery booking atomic service (which booked the museum visit to end at 5 pm (an hour past the closing time of the museum)), the failures are manifested at different places. For example, for subgroup T1, the failure manifests itself at the second tourist bus ride (when the tourists are stranded waiting for the bus to arrive), and for subgroup T2, the failure manifests itself at the taxi ride and at the restaurant.

In cases of failure such as this, it is desirable to be able to pinpoint the originating point of failure (e.g., the art gallery booking atomic service) so that appropriate measures can be taken to resolve the issue, and to do this in a manner that is tamper-proof and non-repudiable. As will be described in additional detail below, in one embodiment, the service composition engine 100 includes a composite service fault manager 110 that is configured to identify an originating point of failure in a composite service 140 executed in the cloud computing environment 130. The composite service fault manager 110 may be implemented using hardware, software, firmware, or any combination thereof.

As previously mentioned, the service composition engine 100 may compose a composite service 140 that comprises of atomic service 150A, atomic service 150B, atomic service 150C, and atomic service 150D and cause the composite service 140 to be executed in the cloud computing environment 130. In one embodiment, the service composition engine 100 may compose the composite service 140 and/or cause the composite service 140 to be executed in the cloud computing environment 130 in response to receiving a request from one or more of the users 120. The execution of the composite service 140 comprises execution of atomic service 150A, atomic service 150B, atomic service 150C, and atomic service 150D in that order. For example, continuing with the travel itinerary booking example discussed above, atomic service 150A may be the museum booking atomic service, atomic service 150B may be the tourist bus ride booking atomic service, atomic service 150C may be the art gallery booking atomic service, and atomic service 150D may be the second tourist bus ride booking atomic service. In one embodiment, multiple instances of a composite service 140 can be executed in the cloud computing environment 130. In one embodiment, each composite service execution instance is assigned an identifier (ID) that uniquely identifies that instance. In one embodiment, the ID is a public key that is assigned to that composite service execution instance. This public key may be referred to herein as the "group public key."

In one embodiment, each atomic service 150 is associated with a private key and a corresponding public key (i.e., a private/public key pair). In one embodiment, a certificate authority or similar entity generates the private keys and corresponding public keys that are to be associated with the respective atomic services 150. The private key is a key that is only known to its owner (e.g., an atomic service 150), whereas the corresponding public key is a key that is made known to one or more third parties. A private/public key pair can be used to perform authentication, where the public key can be used to verify that a holder of the corresponding private key sent the message.

In one embodiment, each atomic service 150 of a composite service 140 is configured to store an execution trace of its executions in the blockchain 160. In one embodiment, the execution trace indicates the execution input of the atomic service 150 and the execution output of the atomic service 150. For example, continuing with the travel itinerary booking example above, the execution input of the art gallery booking atomic service could be the start time (when this activity begins for the tourists) and the execution output of the art gallery booking atomic service could be the end time (when this activity ends for the tourists). In one embodiment, an execution trace also includes a composite service instance ID (that identifies the composite service execution instance that the execution is part of—e.g., the instance ID could be a group public key) and/or a timestamp (that indicates when the atomic service 150 was executed). In one embodiment, each atomic service 150 is configured to (digitally) sign any execution traces it stores in the blockchain 160 using its private key, which allows the execution traces to be authenticated by third parties using the corresponding public keys.

A blockchain is a list of records called "blocks" that are stored in a distributed and decentralized manner. Each block in a blockchain typically includes a cryptographic hash of the previous block (except for the very first block), a timestamp, and transaction data (e.g., a record of the transactions that have occurred and the state of system variables). Blockchain is considered a secure medium for recording transactions as it has inherent properties that resist changes to existing blocks. Since each block in the blockchain is cryptographically linked to a previous block, any changes to a block cannot be made without changing all of its subsequent blocks, which is computationally infeasible once the block has been in the chain for a length of time, and this makes the blockchain tamper-resistant. In order to add a block to a blockchain, contenders need to provide proof of work (or other type of proof such as proof of stake or proof of space) that is verifiable by others. Proof of work is a concept where contenders must solve a computationally expensive puzzle that can be verified by others before being able to add a block to the blockchain. The first contender to solve the puzzle gets to add the block to the blockchain and typically receives a financial reward for its efforts. The blockchain thus provides a tamper-proof storage mechanism.

As mentioned above, atomic services 150 are configured to store their execution traces in the blockchain 160. Also, the atomic services 150 may sign execution traces it stores in the blockchain 160 using its private key. Thus, the execution of a composite service 140 that comprises multiple atomic services 150 may result in forming an ordered sequence of execution traces that are stored in the blockchain 160 (e.g., one execution trace per atomic service 150 that is executed), where each execution trace is signed using the private key of the atomic service 150 that generated that execution trace. Storing execution traces in the blockchain 160 allows the execution traces to be tamper-proof (i.e., immutable), while signing the execution traces using a private key allows the execution traces to be non-repudiable, as the execution traces can be authenticated using the corresponding public keys (that is, a third party can use a public key to verify that a given execution trace was indeed generated by a particular atomic service 150).

The execution of an atomic service 150 may result in a success or failure. If the execution of the atomic service 150 is successful, then an execution trace is stored in the blockchain 160, and this execution trace may include an indication that execution was successful (e.g., a flag indicating successful execution). However, if the execution of the atomic service 150 fails, then the execution trace may indicate that execution failed. In one embodiment, there are two types of failures: (1) incomplete termination and (2) faulty termination. Incomplete termination happens when the atomic service 150 fails to complete its execution for whatever reason. In this case, the execution trace stored in the blockchain 160 may indicate that the atomic service 150 terminated/aborted prematurely. Faulty termination happens when the atomic service 150 completes execution but reports an error. In this case, the execution trace may indicate that an error was reported and/or include information regarding the error. This information can be application-dependent and may include information regarding what type of error occurred and what caused the error.

In one embodiment, as shown in the FIG. 1, the service composition engine 100 includes a composite service fault manager 110 that is configured to identify the originating point of failure in a composite service 140 executed in the cloud computing environment 130. As will be described in additional detail below, in one embodiment, the composite service fault manager 110 is able to identify the originating point of failure based on analyzing execution traces stored in the blockchain 160.

In one embodiment, when the composite service fault manager 110 determines that the execution of a composite service 140 has failed (e.g., based on seeing an execution trace stored in the blockchain 160 that indicates that execution failed), the composite service fault manager 110 analyzes the execution traces of that composite service execution in reverse order. In one embodiment, analysis begins with the execution trace generated by the atomic service 150 at which the failure was detected/manifested. Each of the previous execution traces are then analyzed in reverse order until the originating point of failure is found. In one embodiment, the composite service fault manager 110 authenticates each execution trace it analyzes using the public key associated with the atomic service 150 that generated that execution trace. It should be noted that the public key does not necessarily help with accessing the execution trace itself or the data contained in the execution trace, but helps to authenticate that the execution trace was indeed generated by a particular atomic service 150. In one embodiment, the composite service fault manager 110 is able to determine which of the execution traces stored in the blockchain 160 belong to the same instance of a composite service execution based on the group public key (or other ID that identifies the composite service instance) indicated in the execution traces. In one embodiment, once the composite service fault manager 110 identifies the originating point of failure, it can generate an alert indicating the originating point of failure and/or initiate any remedial actions to address the failure.

In one embodiment, the composite service fault manager 110 analyzes an execution trace by verifying the compatibility of an execution input indicated by the execution trace and an execution output indicated by an immediately preceding execution trace in the sequence. If the composite service fault manager 110 determines that the execution input indicated by the execution trace and the execution output indicated by an immediately preceding execution trace in the sequence are incompatible, then the composite service fault manager 110 may determine that this is where the fault originated.

Additionally or alternatively, in one embodiment, the composite service fault manager 110 analyzes an execution trace by determining whether an execution input and execution output indicated by the execution trace conform to a specification of the atomic service 150 that generated that execution trace. For example, the specification for an atomic service 150 may indicate the range of possible values for the execution input and/or the execution output. An execution trace that indicates an execution input and/or execution output that is out of the specified range would be considered faulty. If the execution input and/or the execution output does not conform to the specification, the composite service fault manager 110 may determine that this is where the fault originated. In one embodiment, the specification for an atomic service 150 is stored in the blockchain 160 and can be accessible from the blockchain.

Returning to the travel itinerary booking example, for subgroup T1, an execution input to the second tourist bus ride booking atomic service would the pickup time of 5 pm. However, this pickup time was derived from an execution output of the art gallery booking atomic service, which specified an end time of 5 pm. Since tourist bus rides can operate throughout the day, a pickup time of 5 pm would not be considered to be faulty. However, checking the end time of the art gallery booking service (5 pm) against the specification of the art gallery booking service would reveal that an end time of 5 pm is invalid since the specification would indicate that the art gallery closes at 4 pm. Based on such analysis, the composite service fault manager 110 may identify the art gallery booking atomic service as being the originating point of failure.

As another example, for subgroup T2, an execution input to the restaurant reservation booking atomic service would be the arrival time of 7 pm. If subgroup T2 actually arrives at the restaurant late at 8 pm, then this can admit two possibilities: (1) the concert booking atomic service is faulty, having specified an end time of 8 pm (which is incompatible with the execution input to the restaurant reservation booking atomic service of 7 pm); or (2) the concert ended late. In the first case, the fault lies with the concert booking atomic service. In the second case, the fault does not lie with any particular atomic service 150. Based on such analysis (e.g., detecting the incompatibility of the execution output of the concert booking atomic service and the execution input of the restaurant reservation booking service), the composite service fault manager 110 may identify the concert booking atomic service as potentially being the originating point of failure.

An advantage of embodiments described herein is that since execution traces are stored in the blockchain 160 and are signed using a private key, they are tamper-proof and non-repudiable. If execution of a composite service fails, then the execution traces can be analyzed to determine the originating point of failure. Since the execution traces are stored in the blockchain 160, it can be ensured that they have not been tampered with. Also, the execution traces can be authenticated using public keys, which ensures that they are non-repudiable.

Figure 2:
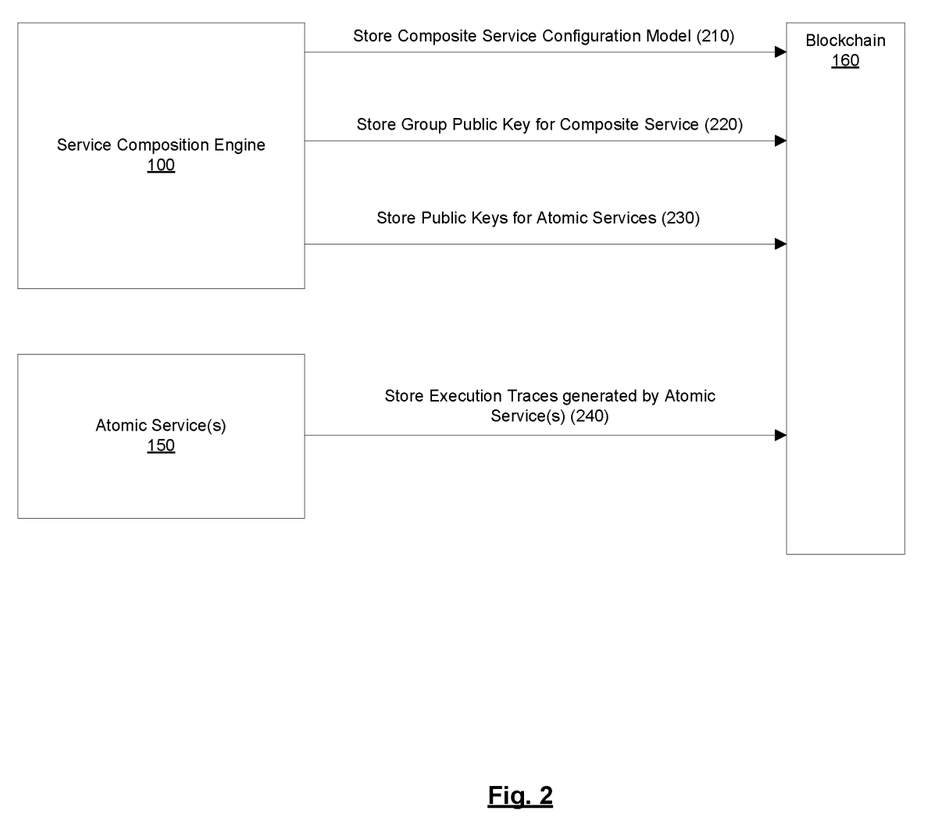
FIG. 2 is a block diagram illustrating the process for deploying a composite service for execution, according to some embodiments.

FIG. 2 is a block diagram illustrating the process for deploying a composite service for execution, according to some embodiments. As mentioned above, the service composition engine 100 may compose a composite service 140 that comprises an ordered sequence atomic services 150. As part of deploying the composite service 140 for execution in the cloud computing environment 130, the service composition engine 100 may deploy one or more of the atomic services 150 that comprise the composite service 140 in the cloud computing environment 130. In one embodiment, the service composition engine 100 stores information about the deployed atomic services 150 in the blockchain 160. At operation 210, the service composition engine 100 stores the composite service configuration model in the blockchain. The composite configuration model may indicate information about the composite service 140 such as the sequence of atomic services 150 that comprise the composite service 140. At operation 220, the service composition engine 100 assigns a group public key (or other identifier) for the composite service execution and stores this group public key in the blockchain 160. The group public key serves as an identifier for this particular instance of the composite service execution. The service composition engine 100 may assign private keys and corresponding public keys (i.e., private/public key pairs) to the atomic services 150. At operation 230, the service composition engine 100 stores the public keys assigned to the atomic services 150 in the blockchain 160 so that they are accessible to third parties. The private keys are maintained by the atomic services 150 themselves and kept private. In one embodiment, the service composition engine 100 also assigns an instance ID to each instance of an atomic service 150.

During execution of the composite service 140, at operation 240 each atomic service 150 that is executed as part of the execution of the composite service 140 stores an execution trace in the blockchain 160. These execution traces may include the group public key associated with the currently executed instance of the composite service 140. This helps to indicate that these execution traces belong to the same composite service execution instance. Also, the execution traces are signed using the private keys associated with the atomic services 150 that generated the execution traces, which allows the execution traces to be authenticated using the corresponding public keys. In this manner, embodiments may use a hierarchical key structure where the group public key identifies the composite service execution instance and the private/public key pairs are used to authenticate the execution traces generated as part of the execution of this instance.

Figure 3A:
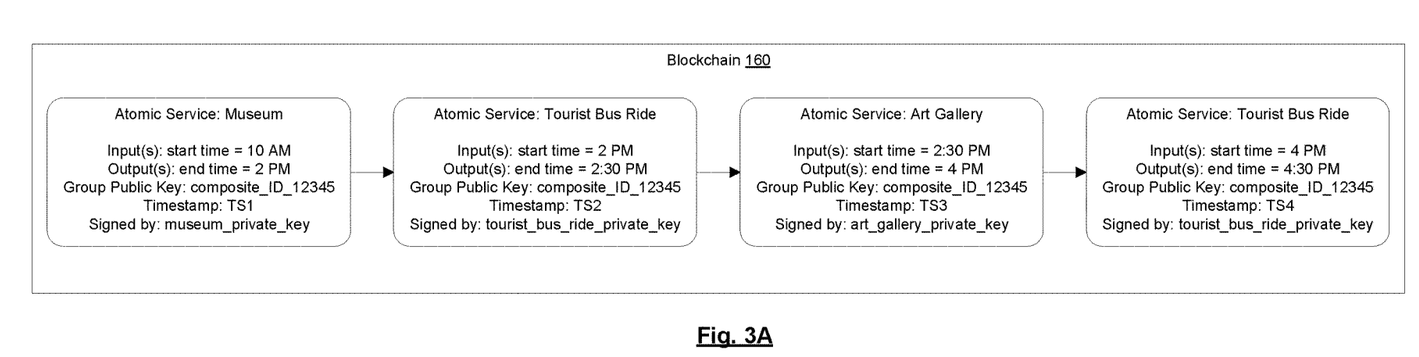
FIG. 3A is a diagram illustrating execution traces stored in a blockchain for a non-faulty composite service execution, according to some embodiments.

FIG. 3A is a diagram illustrating execution traces stored in a blockchain for a non-faulty composite service execution, according to some embodiments. As shown in the diagram, the blockchain 160 stores an ordered sequence of execution traces. In this example, each execution trace includes the execution input(s), the execution output(s), the group public key that identifies a composite service instance, and a timestamp. The first execution trace in the sequence is generated by a museum booking atomic service. The execution input(s) of this execution trace indicates that the start time is 10 am and the execution output(s) of this execution trace indicates that the end time is 2 pm. The timestamp is TS1. The execution trace is signed by the private key associated with the museum booking atomic service (referred to in the diagram as "museum_private_key").

The second execution trace in the sequence is generated by a tourist bus ride booking atomic service. The execution input(s) of this execution trace indicates that the start time is 2 pm and the execution output(s) of this execution trace indicates that the end time is 2:30 pm. The timestamp is TS2. The execution trace is signed by the private key associated with the tourist bus ride booking atomic service (referred to in the diagram as "tourist_bus_ride_private_key").

The third execution trace in the sequence is generated by an art gallery booking atomic service. The execution input(s) of this execution trace indicates that the start time is 2:30 pm and the execution output(s) of this execution trace indicates that the end time is 4 pm. The timestamp is TS3. The execution trace is signed by the private key associated with the art gallery booking service (referred to in the diagram as "art_gallery_private_key").

The fourth execution trace in the sequence is also generated by the tourist bus ride booking atomic service. The execution input(s) of this execution trace indicates that the start time is 4 pm and the execution output(s) of this execution trace indicates that the end time is 4:30 μm. The timestamp is TS4. The execution trace is signed by the private key associated with the tourist bus ride booking atomic service. All four of the execution traces in this example include a group public key of "composite_ID_12345," which identifies this instance of the composite service execution.

In this example, the composite service execution has no faults. An example of a faulty execution is shown in FIG. 3B, which is further described below.

Figure 3B:
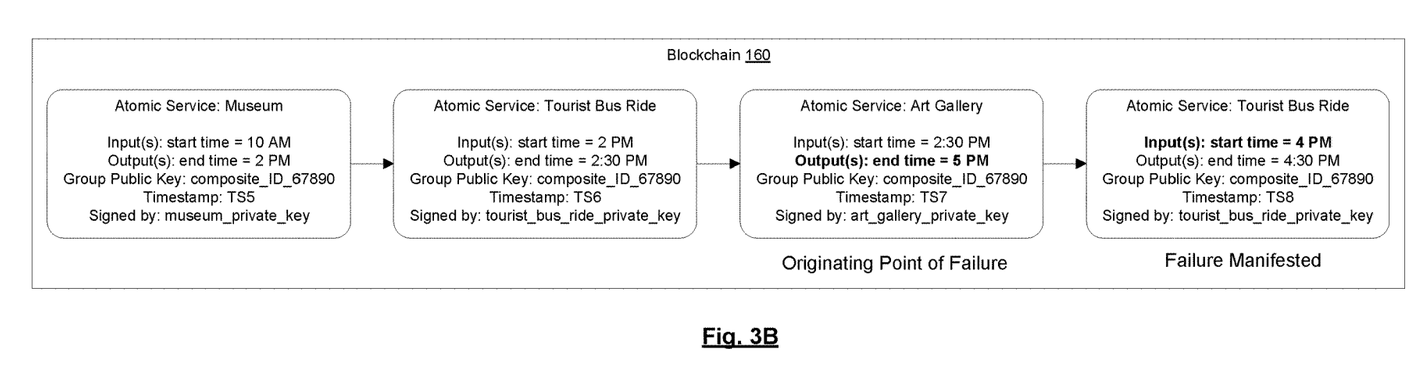
FIG. 3B is a diagram illustrating execution traces stored in a blockchain for a faulty composite service execution, according to some embodiments.

FIG. 3B is a diagram illustrating execution traces stored in a blockchain for a faulty composite service execution, according to some embodiments. The execution traces shown in this diagram (which are also stored in the blockchain 160) are similar to the ones shown in FIG. 3A except that the third execution trace (generated by the art gallery booking atomic service) has an execution output that indicates an end time of 5 pm and the fourth execution trace (generated by the tourist bus ride booking atomic service) has an execution input that indicates a start time of 4 pm. Also, the execution traces in this example include a group public key of "composite_ID_67890," which identifies this instance of the composite service execution.

With this itinerary booking, the tourists will be late for the second tourist bus ride (bus pick up time is at 4 pm but the tourists do not show up until 5 pm so the bus may have departed without the tourists). As a result, the tourists may report a complaint with the travel booking company regarding this mishap. The travel booking company may then use the composite service fault manager 110 to automatically analyze the execution traces to determine the originating point of the failure. For example, the composite service fault manager 110 may start with analyzing the fourth execution trace in the sequence (the last one in the sequence) and proceed in reverse order. As part of its analysis, the composite service fault manager 110 may verify the compatibility of the execution input of the fourth execution trace and the execution output of the immediately preceding execution trace (the third execution trace). From this, the composite service fault manager 110 will discover that there is a mismatch (third execution trace indicates end time of 5 pm and fourth execution trace indicated start time of 4 pm), and thus identify the third execution trace as being the originating point of failure.

Figure 4:
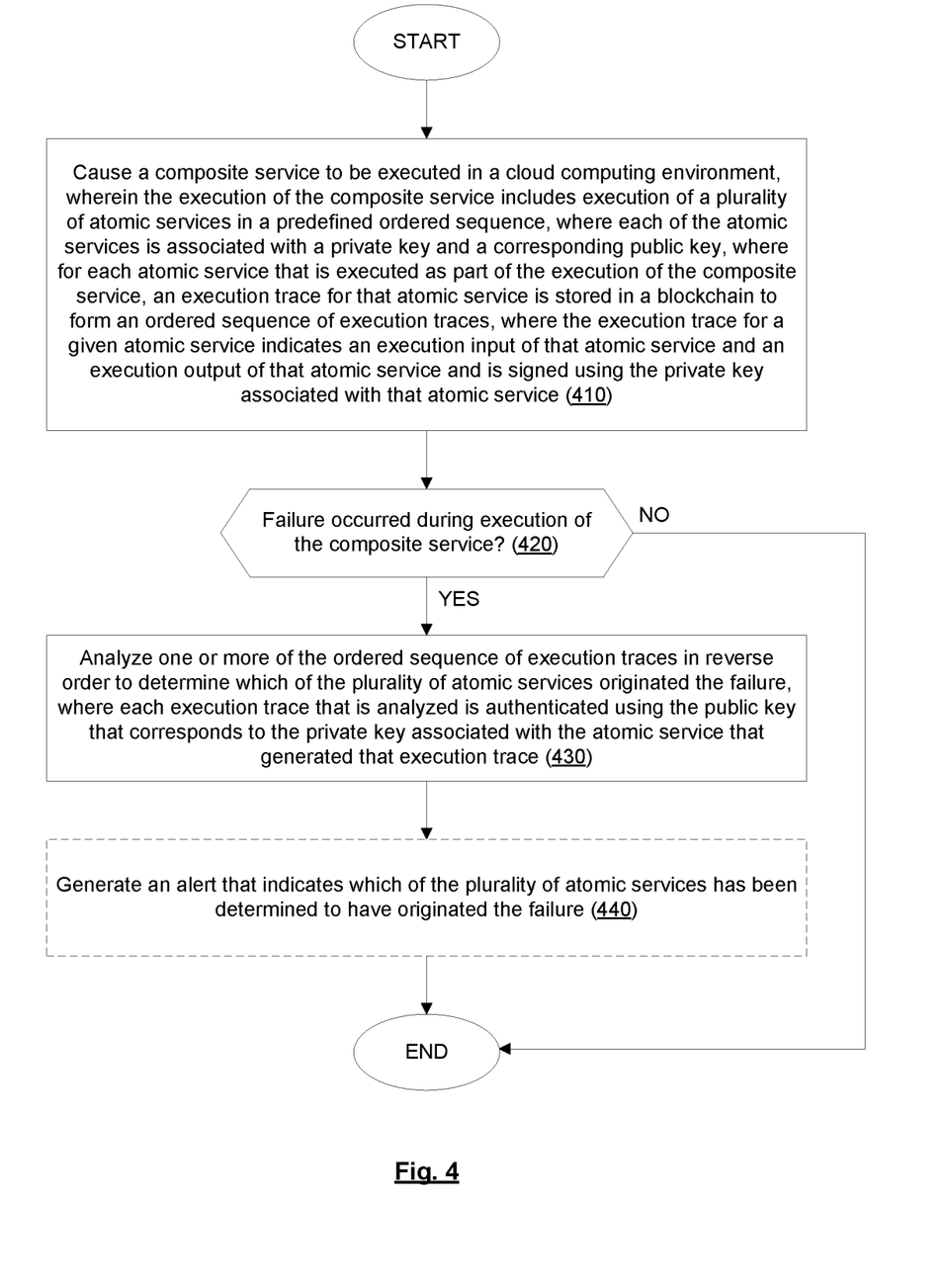
FIG. 4 is a flow diagram of a process for identifying an originating point of failure in a composite service executed in a cloud computing environment, according to some embodiments.

FIG. 4 is a flow diagram of a process for identifying an originating point of failure in a composite service executed in a cloud computing environment, according to some embodiments. In one embodiment, the process is performed by a service composition engine 100. In one embodiment, one or more of the operations are performed by the composition service fault manager 110 of the service composition engine 100. The process may be implemented using hardware, software, firmware, or any combination thereof. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

At block 410, the service composition engine causes a composite service to be executed in a cloud computing environment, wherein the execution of the composite service includes execution of a plurality of atomic services in a predefined ordered sequence, where each of the atomic services is associated with a private key and a corresponding public key, where for each atomic service that is executed as part of the execution of the composite service, an execution trace for that atomic service is stored in a blockchain to form an ordered sequence of execution traces, where the execution trace for a given atomic service indicates an execution input of that atomic service and an execution output of that atomic service and is signed using the private key associated with that atomic service. In one embodiment, the private keys and corresponding public keys associated with the plurality of atomic services are provisioned by a certificate authority. In one embodiment, the execution output of a given atomic service from the plurality of atomic services includes an indication of whether execution was successful and further includes an indication of a reason for failure if the execution was not successful. In one embodiment, there can be multiple instances of a composite service execution and each composite service execution instance is associated with a group public key that serves as an identifier for that composite service execution instance.

At decision block 420, the service composition engine determines whether a failure occurred during execution of the composite service. If no failure occurred, then the process ends. However, if a failure occurred, then the process proceeds to block 430.

At block 430, the service composition engine analyzes one or more of the ordered sequence of execution traces in reverse order to determine which of the plurality of atomic services originated the failure, where each execution trace that is analyzed is authenticated using the public key that corresponds to the private key associated with the atomic service that generated that execution trace. In one embodiment, the analyzing includes verifying compatibility of an execution input indicated by a given execution trace and an execution output indicated by an immediately preceding execution trace in the ordered sequence of execution traces. Additionally or alternatively, in one embodiment, the analyzing includes determining whether an execution input and an execution output indicated by an execution trace generated by an atomic service conforms to a specification of that atomic service. In one embodiment, the specification is stored in the blockchain.

In one embodiment, at block 440, the service composition engine generates an alert that indicates which of the plurality of atomic services has been determined to have originated the failure.

Figures 5A, 5B:
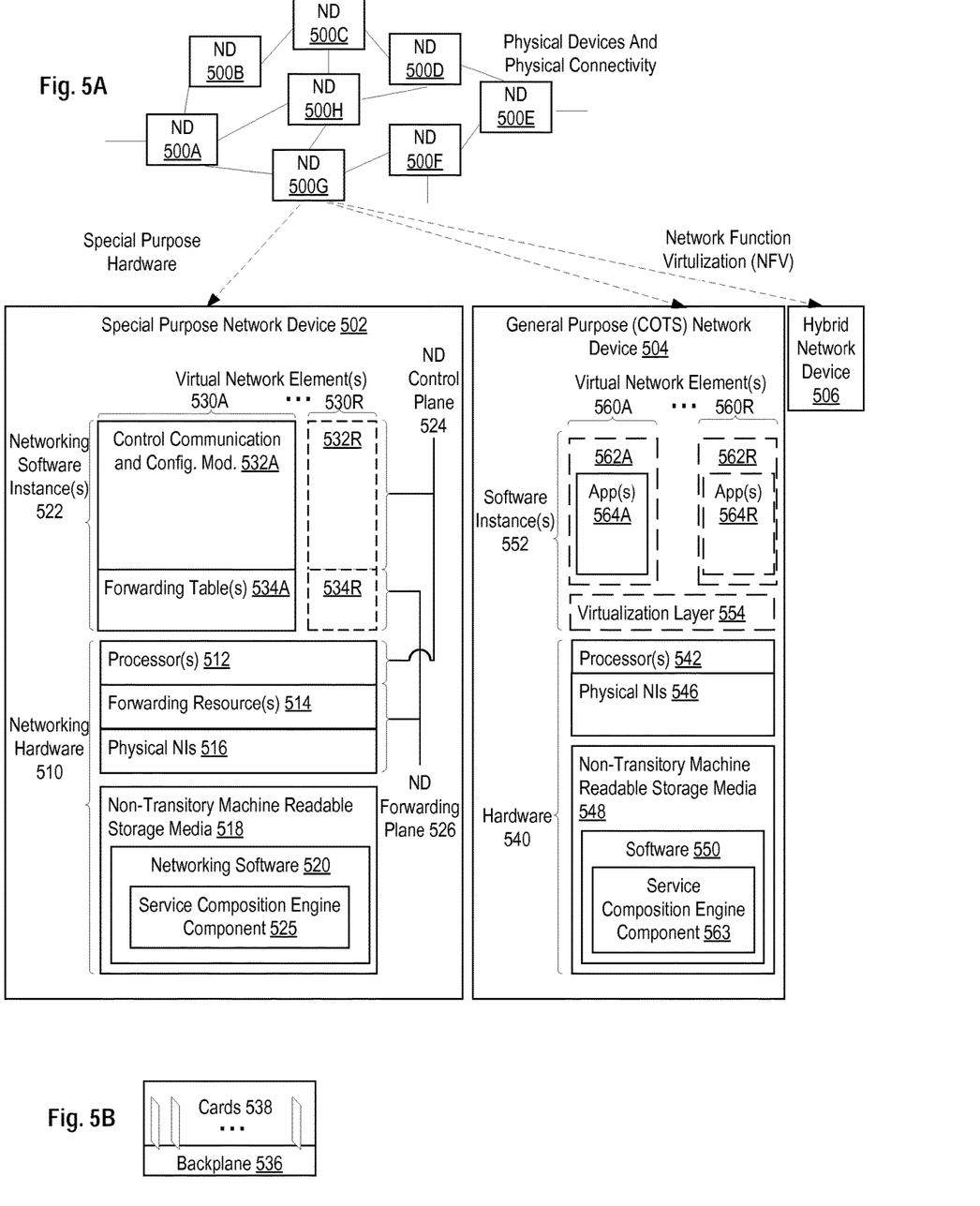
FIG. 5A illustrates connectivity between network devices (NDs) within an exemplary network, as well as three exemplary implementations of the NDs, according to some embodiments.
FIG. 5B illustrates an exemplary way to implement a special-purpose network device according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as service composition engine component 525, which when executed by networking hardware 510, causes the special-purpose network device 502 to perform operations of one or more embodiments described herein above as part networking software instances 522 (e.g., to provide the fault pinpointing functionality described herein).

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

Software 550 can include code such as service composition engine component 563, which when executed by processor(s) 542, cause the general purpose network device 504 to perform operations of one or more embodiments described herein above as part software instances 562A-R (e.g., to provide the fault pinpointing functionality described herein).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by one or more network devices to identify an originating point of failure in a composite service executed in a cloud computing environment, the method comprising:
  causing the composite service to be executed in the cloud computing environment, wherein the execution of the composite service includes execution of a plurality of atomic services in a predefined ordered sequence, wherein each of the atomic services is associated with a private key and a corresponding public key, wherein for each atomic service that is executed as part of the execution of the composite service, an execution trace for that atomic service is stored in a blockchain to form an ordered sequence of execution traces, wherein the execution trace for a given atomic service indicates an execution input of that atomic service and an execution output of that atomic service and is signed using the private key associated with that atomic service;

determining that a failure occurred during execution of the composite service; and responsive to determining that the failure occurred, analyzing one or more of the ordered sequence of execution traces in reverse order to determine which of the plurality of atomic services originated the failure, wherein each execution trace that is analyzed is authenticated using the public key that corresponds to the private key associated with the atomic service that generated that execution trace.

2. The method of claim 1, wherein the analyzing includes verifying compatibility of an execution input indicated by a given execution trace and an execution output indicated by an immediately preceding execution trace in the ordered sequence of execution traces.

3. The method of claim 1, wherein the analyzing includes determining whether an execution input and an execution output indicated by an execution trace generated by an atomic service conforms to a specification of that atomic service.

4. The method of claim 3, wherein the specification is stored in the blockchain.

5. The method of claim 1, wherein each composite service execution instance is associated with a group public key that serves as an identifier for that composite service execution instance.

6. The method of claim 1, wherein the private keys and corresponding public keys associated with the plurality of atomic services are provisioned by a certificate authority.

7. The method of claim 1, wherein the analyzing is performed in response to the determination that the failure occurred during execution of the composite service.

8. The method of claim 1, wherein the execution output of a given atomic service from the plurality of atomic services includes an indication of whether execution was successful and further includes an indication of a reason for failure if the execution was not successful.

9. The method of claim 1, further comprising:
generating an alert that indicates which of the plurality of atomic services has been determined to have originated the failure.

10. A network device configured to identify an originating point of failure in a composite service executed in a cloud computing environment, the network device comprising:
a set of one or more processors; and
a non-transitory machine-readable storage medium having stored therein a service composition engine component, which when executed by the set of one or more processors, causes the network device to:
cause the composite service to be executed in the cloud computing environment, wherein the execution of the composite service includes execution of a plurality of atomic services in a predefined ordered sequence, wherein each of the atomic services is associated with a private key and a corresponding public key, wherein for each atomic service that is executed as part of the execution of the composite service, an execution trace for that atomic service is stored in a blockchain to form an ordered sequence of execution traces, wherein the execution trace for a given atomic service indicates an execution input of that atomic service and an execution output of that atomic service and is signed using the private key associated with that atomic service, determine that a failure occurred during execution of the composite service, and responsive to determining that the failure occurred, analyze one or more of the ordered sequence of execution traces in reverse order to determine which of the plurality of atomic services originated the failure, wherein each execution trace that is analyzed is authenticated using the public key that corresponds to the private key associated with the atomic service that generated that execution trace.

11. The network device of claim 10, wherein the analyzing includes verifying compatibility of an execution input indicated by a given execution trace and an execution output indicated by an immediately preceding execution trace in the ordered sequence of execution traces.

12. The network device of claim 10, wherein the analyzing includes determining whether an execution input and an execution output indicated by an execution trace generated by an atomic service conforms to a specification of that atomic service.

13. The network device of claim 12, wherein the specification is stored in the blockchain.

14. The network device of claim 10, wherein each composite service execution instance is associated with a group public key that serves as an identifier for that composite service execution instance.

15. The network device of claim 10, wherein the private keys and corresponding public keys associated with the plurality of atomic services are provisioned by a certificate authority.

16. A non-transitory machine-readable medium having computer code stored therein, which when executed by a set of one or more processors of one or more network devices, causes the one or more network devices to perform operations for identifying an originating point of failure in a composite service executed in a cloud computing environment, the operations comprising:
causing the composite service to be executed in the cloud computing environment, wherein the execution of the composite service includes execution of a plurality of atomic services in a predefined ordered sequence, wherein each of the atomic services is associated with a private key and a corresponding public key, wherein for each atomic service that is executed as part of the execution of the composite service, an execution trace for that atomic service is stored in a blockchain to form an ordered sequence of execution traces, wherein the execution trace for a given atomic service indicates an execution input of that atomic service and an execution output of that atomic service and is signed using the private key associated with that atomic service;

determining that a failure occurred during execution of the composite service; and responsive to determining that the failure occurred, analyzing one or more of the ordered sequence of execution traces in reverse order to determine which of the plurality of atomic services originated the failure, wherein each execution trace that is analyzed is authenticated using the public key that corresponds to the private key associated with the atomic service that generated that execution trace.

17. The non-transitory machine-readable medium of claim 16, wherein the analyzing includes verifying compatibility of an execution input indicated by a given execution trace and an execution output indicated by an immediately preceding execution trace in the ordered sequence of execution traces.

18. The non-transitory machine-readable medium of claim 16, wherein the analyzing includes determining whether an execution input and an execution output indicated by an execution trace generated by an atomic service conforms to a specification of that atomic service.

19. The non-transitory machine-readable medium of claim 16, wherein the analyzing is performed in response to the determination that the failure occurred during execution of the composite service.

20. The non-transitory machine-readable medium of claim 16, wherein the computer code, when executed by the set of one or more processors of the one or more network devices, causes the one or more network devices to perform further operations comprising:
generating an alert that indicates which of the plurality of atomic services has been determined to have originated the failure.

* * * * *